(12) United States Patent
Majzlik et al.

(10) Patent No.: US 8,069,006 B1
(45) Date of Patent: Nov. 29, 2011

(54) SYSTEM FOR POSITIONING A WIRE USING SENSOR INFORMATION

(75) Inventors: Edward Majzlik, Houston, TX (US); Alfred L. Hise, Wiggins, MS (US); Brian Hardy, Friendswood, TX (US)

(73) Assignee: NCS Subsea, Inc., Stafford, TX (US)

( * ) Notice: Subject to any disclaimer, the term of this patent is extended or adjusted under 35 U.S.C. 154(b) by 0 days.

(21) Appl. No.: 13/113,967

(22) Filed: May 23, 2011

(51) Int. Cl.
*G06F 15/00* (2006.01)
(52) U.S. Cl. ....................................... 702/150
(58) Field of Classification Search .................... 702/150
See application file for complete search history.

(56) References Cited

U.S. PATENT DOCUMENTS

| | | | |
|---|---|---|---|
| 6,700,835 B1 * | 3/2004 | Ward et al. ............... | 367/131 |
| 7,221,620 B2 | 5/2007 | Planke et al. | |

* cited by examiner

*Primary Examiner* — Tung S Lau
(74) *Attorney, Agent, or Firm* — Buskop Law Group, PC; Wendy Buskop

(57) ABSTRACT

A system for determining coordinates for nodes on a wire secured to tow lines of a floating vessel for analyzing geological formations is provided. The system can include sensors in communication with a processor to determine the coordinates of nodes and provide azimuths tangential to the wire. A library of nominal values for third, fourth, or fifth order polynomial coefficients, a library of known distances along the wire, and a library of preset limits can be stored in a data storage. The system can include computer instructions to receive sensor information, compute bearing, reorient the coordinates, rotate the azimuth, construct a third, fourth, or fifth order polynomial algorithm, compute the azimuth, form a residual, compute updated differences until the residual is within preset limits, calculate local coordinates for nodes, and rotate the local coordinates from the local coordinate system to the projected coordinate system.

19 Claims, 10 Drawing Sheets

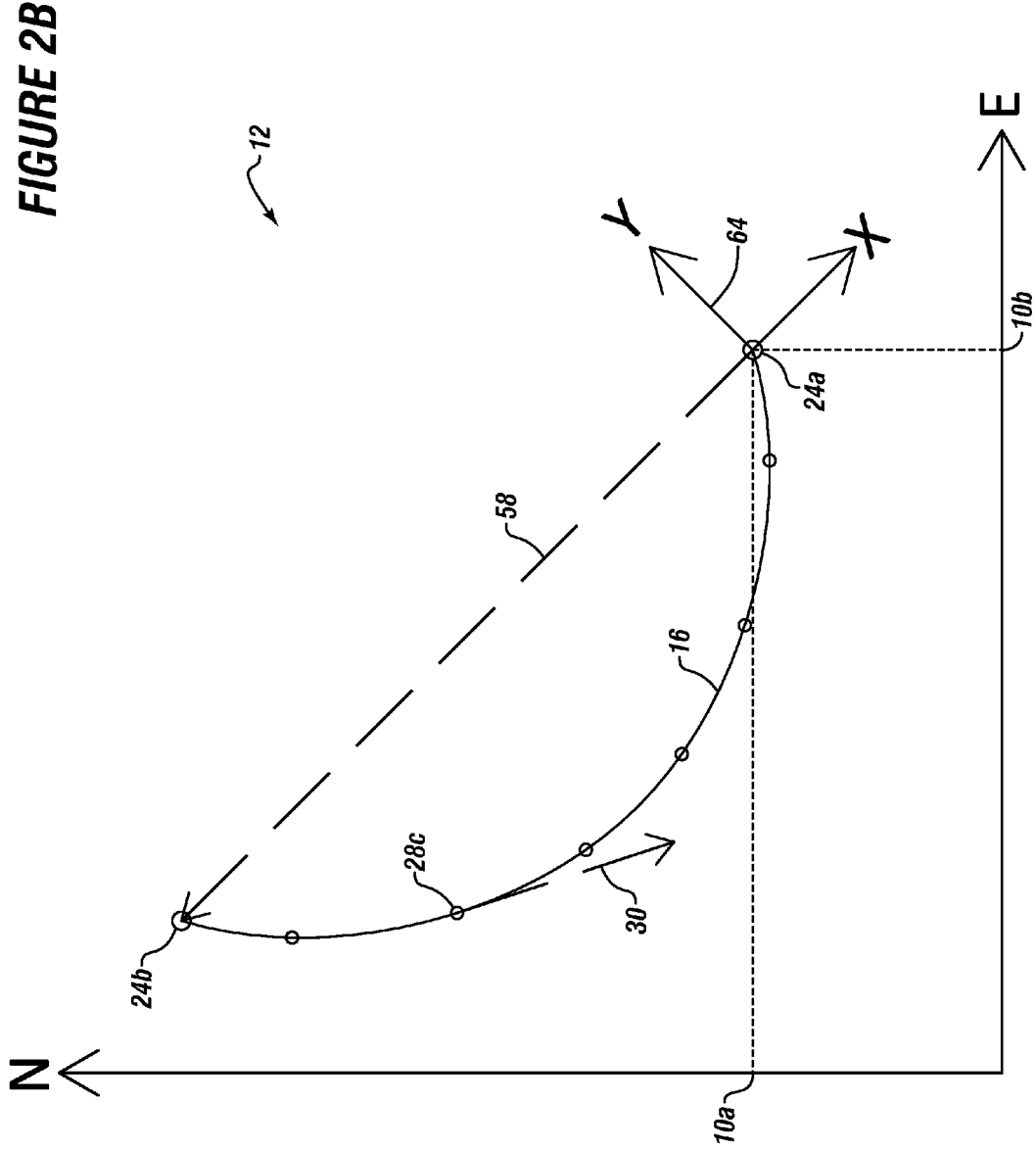

FIGURE 4

| NODE | LOCAL X-COORDINATE | LOCAL Y-COORDINATE | PROJECTED X-COORDINATE | PROJECTED Y-COORDINATE | EVENT | TIME STEP |
|------|---------------------|---------------------|------------------------|------------------------|-------|-----------|
| 14a  | 62a                 | 62b                 | 10a                    | 10b                    | 119a  | 142a      |
| 14b  | 62c                 | 62d                 | 10c                    | 10d                    | 119b  | 142b      |
| 14c  | 62e                 | 62f                 | 10e                    | 10f                    | 119c  | 142c      |

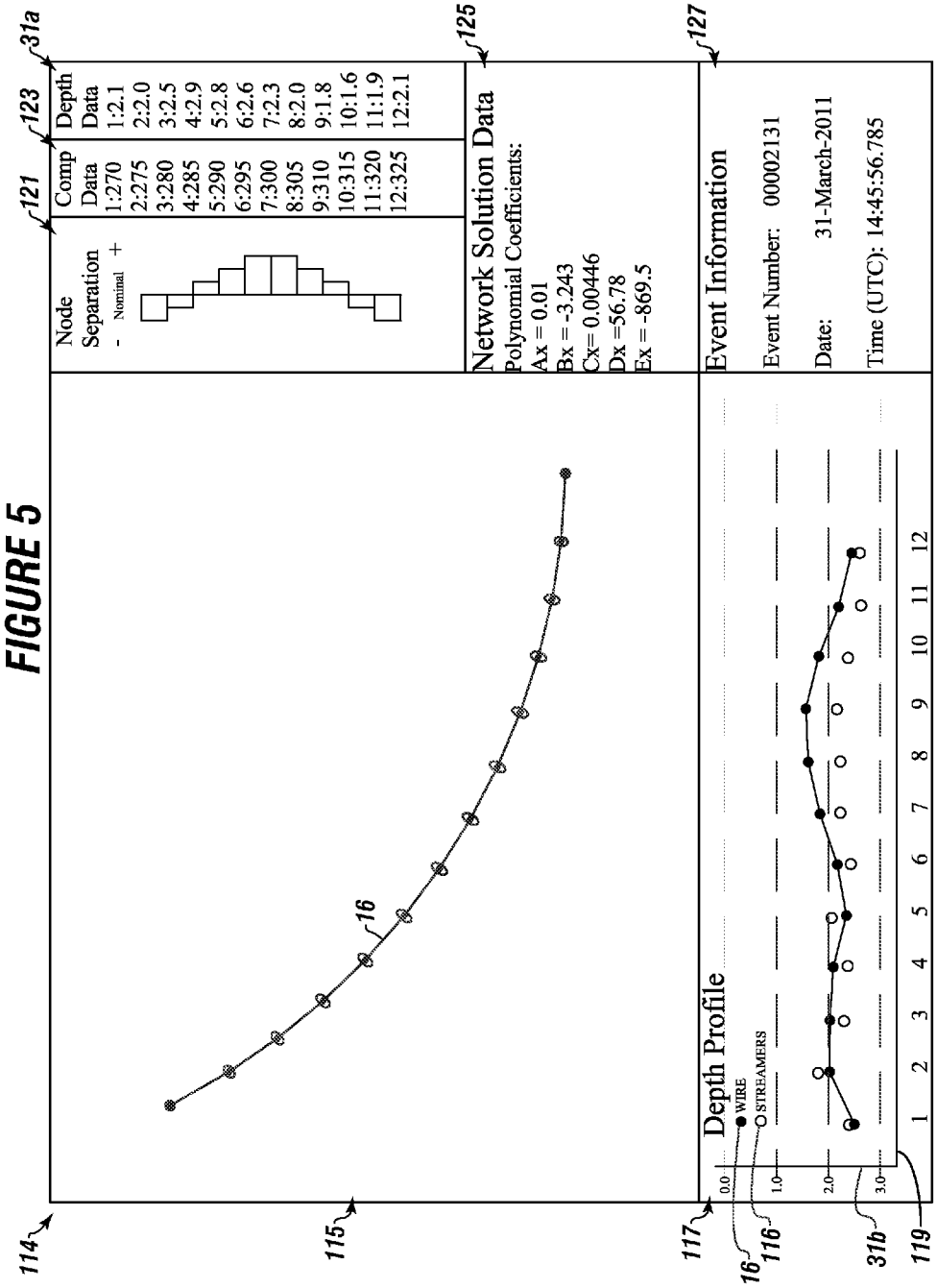

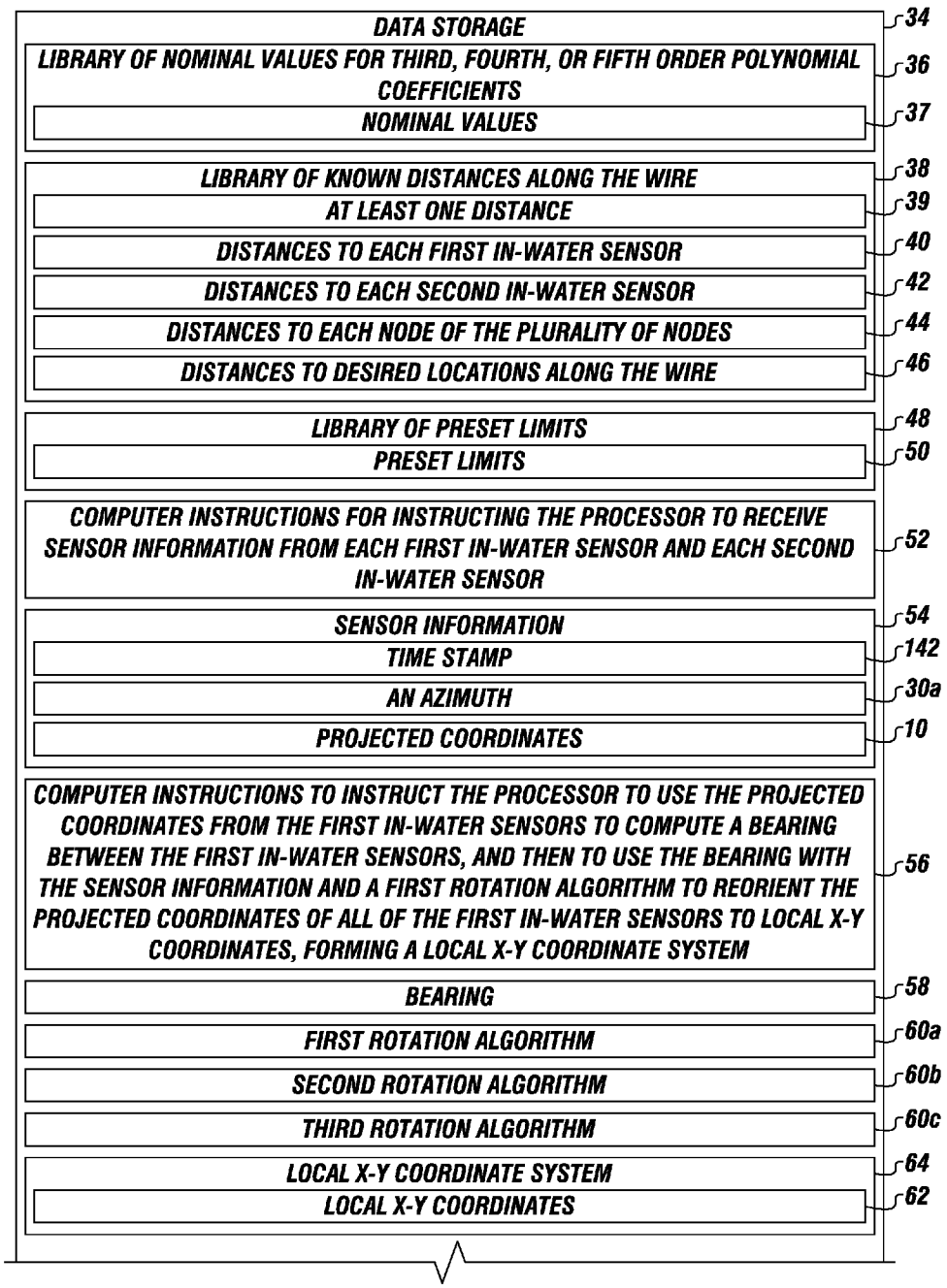

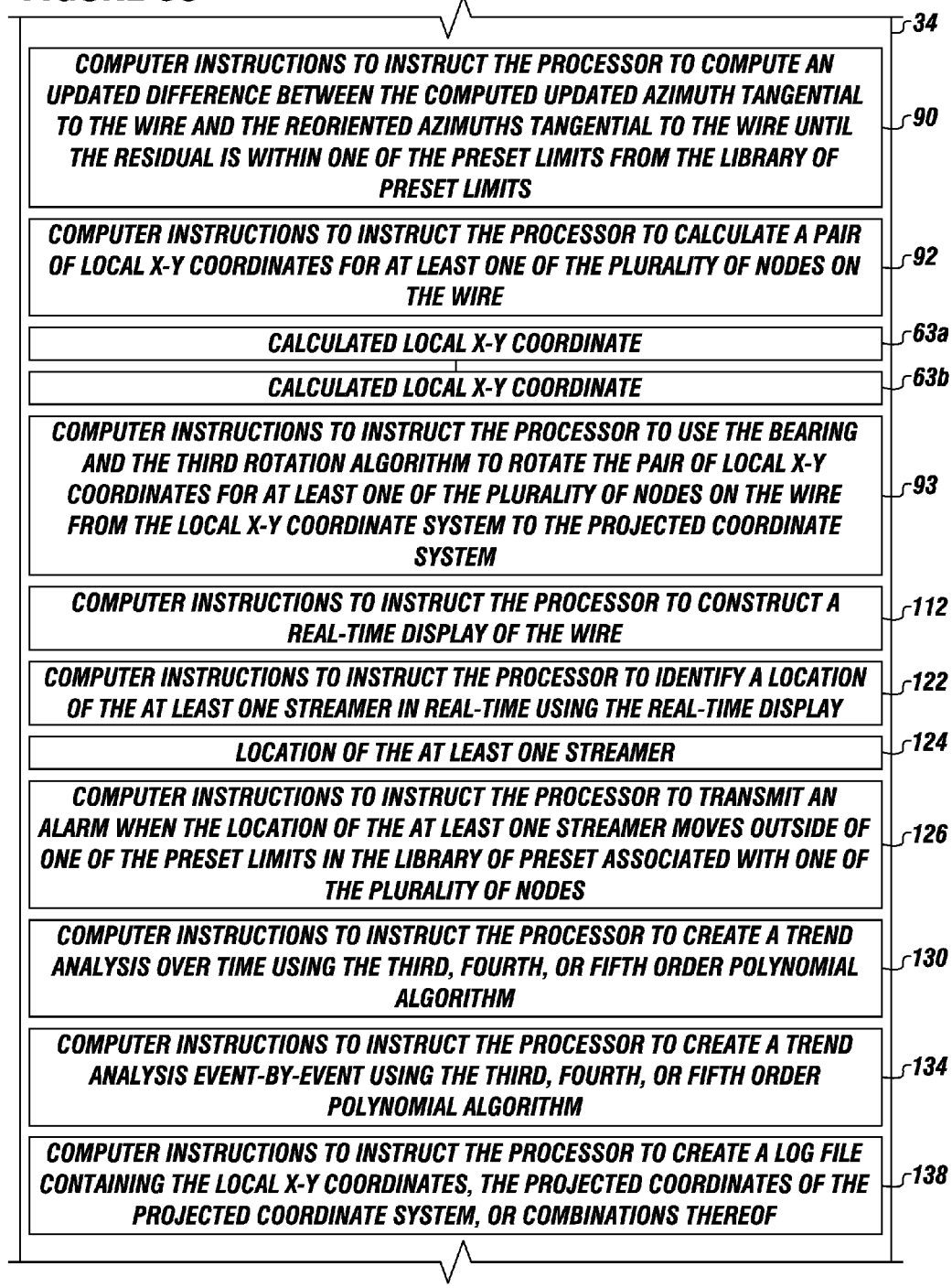

SYSTEM FOR POSITIONING A WIRE USING SENSOR INFORMATION

FIELD

The present embodiments generally relate to a system for determining projected coordinates in a projected coordinate system for at least one node on a wire.

BACKGROUND

A need exists for an improved seismic positioning system for positioning wires pulled from a floating vessel over a near surface geological formation.

The present embodiments meet these needs.

BRIEF DESCRIPTION OF THE DRAWINGS

The detailed description will be better understood in conjunction with the accompanying drawings as follows:

FIGS. 2A-2B depict local coordinates on a local coordinate system and projected coordinates on a projected coordinate system.

FIG. 4 depicts an embodiment of a log file.

FIG. 5 depicts an embodiment of a portion of a real-time display.

FIGS. 6A-6D depict an embodiment of a data storage.

Figure 1:
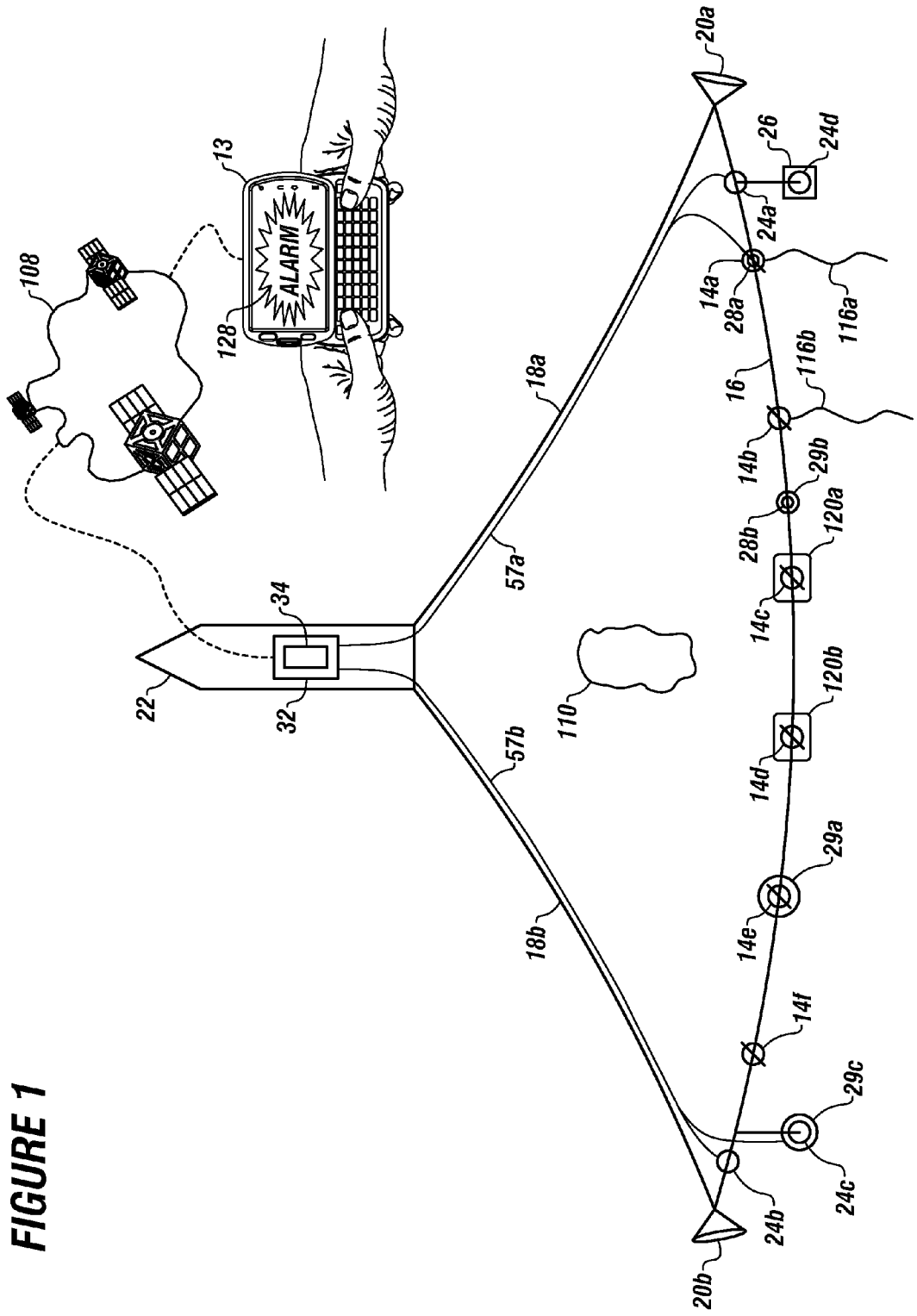
FIG. 1 depicts a wire being towed from a floating vessel.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system for determining projected coordinates in a projected coordinate system for at least one node on a wire towed by a floating vessel. The system can be a computer implemented system.

The system can be used to position equipment used to detect near surface geology formations during high resolution marine geophysical surveying.

The wire can be secured to two separated tow lines that are both secured to a floating vessel. For example, each tow line can have a diverter attached thereto opposite the floating vessel, and the wire can be secured to the diverters. The wire can form a curve.

The floating vessel can be a geophysical survey vessel.

The tow lines can be wire rope, electrical wire, cable, polymer rope, hemp rope, or combinations thereof. The tow lines can be attached to the floating vessel by any suitable connector, such as cleats.

The diverters can be those made by The Baro Companies, of Stafford, Tex.

The wire can be wire made by Geometrics, and can have a plurality of nodes disposed along a length of the wire.

Each node can be a determined point along the length of the wire. For example, the node can be at a tow point for a streamer, a location of an in-water sensor, a tow point for a hydrophone, or any other location along the wire.

The projected coordinates that are determined using the system can be coordinates, such as x-y coordinates on the projected coordinate system. The projected coordinate system can be a Cartesian coordinate system projected over a body of water, such as a Universal Transverse Mercator Grid in the Gulf of Mexico.

The system can be used to determine a projected coordinate for each of the plurality of nodes on the wire.

The system can include at least a pair of first in-water sensors. Each first in-water sensor can be positioned proximate to an end of the wire. An example of a first in-water sensor is a sensor available from PBX Systems, which provides GPS sensor data.

Each first in-water sensor can be embedded in the wire, positioned adjacent one of the plurality of nodes on the wire, proximate to the wire, on a buoy towed from the wire, or combinations thereof. The buoy can be a floating piece of foam or the like.

Each first in-water sensor can be deployed to determine the projected coordinates for a position on the wire.

In one or more embodiments each first in-water sensor can be a global positioning system sensor; a laser sensor, such as an MDL Fanbeam type sensor; an acoustic sensor, such as a Sonardyne type sensor; or combinations thereof.

In one or more embodiments the system can account for changes in the shape of the wire to provide accurate node locations using the global positioning system sensor, compass headings, and other information. For example, the compass headings can be detected by a 3004 digital compass made by Spartan Electronics.

The system can include at least a pair of second in-water sensors. Each second in-water sensor can be embedded in the wire, attached to the wire, or combinations thereof.

The second in-water sensors can be deployed to provide azimuths tangential to the wire.

The term "azimuths tangential to the wire" refers to the bearing of the wire at the node where the second in-water sensor for determining compass headings is attached.

The system can include a processor in communication with a data storage, each first in-water sensor, and each second in-water sensor.

The processor can be configured to process in real-time as the floating vessel traverses over a near surface geological formation.

Real-time processing can include collecting and processing data from about every 1 second to about every 20 seconds.

A near surface geological formation can be an oil reservoir, a gas reservoir, a salt dome, or other geological formations.

In one or more embodiments, instead of or in addition to processing in real-time, the processor can perform processing after the floating vessel has acquired information from all of the first in-water sensors and all of the second in-water sensors. For example, the processing can be performed immediately after all of the sensor information is collected or any time thereafter.

The data storage can be a hard drive, a jump drive, or any computer readable medium.

One or more embodiments of the data storage can include a dynamic information database, such as a structured query language (SQL) server database, for storing data within, such as the sensor information.

A library of nominal values for third, fourth, and/or fifth order polynomial coefficients can be stored in the data storage.

The library of nominal values for third, fourth, and/or fifth order polynomial coefficients can include nominal values. The nominal values can be any number.

A library of known distances along the wire can be stored in the data storage. The library of known distances along the wire can include distances from the connection of the wire to the first tow line to each of the first in-water sensors.

The library of known distances along the wire can include distances from each first in-water sensor to each second in-water sensor.

The library of known distances along the wire can include distances from each node to each other node, or from each in-water sensor to each node.

The library of known distances along the wire can include any other known distance along or relative to the wire.

A library of preset limits can be stored in the data storage comprising preset limits. For example, the preset limits can include a measurement between two nodes, a water depth, a compass heading, a rate of change in compass heading, or another measurement.

The data storage can have computer instructions for instructing the processor to receive sensor information from each first in-water sensor and each second in-water sensor. For example, each first in-water sensor and each second in-water sensor can collect sensor information and can transmit that sensor information to the processor for storage on the data storage.

The sensor information can include an azimuth tangential to the wire, the projected coordinates for a position on the wire, a water depth of a node, a compass heading of a node, a global positioning system location of a node, or combinations thereof.

Each portion of sensor information can include a time stamp associated with a specific sensor measurement. The time stamps can identify the time that the sensor measurement was taken and validated.

The data storage can have computer instructions to instruct the processor to use the projected coordinates from the first in-water sensors to compute a bearing between the first in-water sensors.

For example, the bearing can be computed by the following equation: $\theta=\arctan((y1-y2)/(x1-x2))$, with x1 and y1 being the projected coordinates of one first in-water sensor, and x2 and t2 being the projected coordinates of another first in-water sensor.

The data storage can have computer instructions to instruct the processor to use the bearing with the sensor information and a first rotation algorithm to reorient the projected coordinates of all of the first in-water sensors to local x-y coordinates, forming a local x-y coordinate system.

In one or more embodiments the first rotation algorithm can be used to rotate the projected coordinates to the local coordinates by a rotation angle $\theta$. For example, the x coordinate of the projected coordinates can be rotated by the following equation: $x=E*\cos\theta+N*\sin\theta$. The y coordinate of the projected coordinates can be rotated by the following equation: $y=-E*\sin\theta+N*\cos\theta$. In the first rotation algorithm equations above, x is the local x coordinate, y is the local y coordinate, E is the projected easting coordinate, N is the projected northing coordinate, and $\theta$ is the rotation angle.

The data storage can have computer instructions to instruct the processor to rotate the azimuth tangential to the wire from the second in-water sensors using the bearing and a second rotation algorithm to reorient all azimuths tangential to the wire of all the second in-water sensors into the local x-y coordinate system.

In one or more embodiments the second rotation algorithm can be used to rotate the azimuth tangential to the wire into the local x-y coordinate system by a rotation angle $\theta$. For example, a rotated azimuth tangential to the wire can be determined by: $A'=A+\theta$. In the second rotation algorithm A' is the rotated azimuth, A is the measured azimuth, and $\theta$ is the rotation angle.

The data storage can have computer instructions to instruct the processor to construct a third, fourth, and/or fifth order polynomial algorithm of the wire in real-time.

For example, a third order polynomial algorithm of the wire can be: $y=ax^3+bx^2+cx+d$. A fourth order polynomial algorithm of the wire can be: $y=ax^4+bx^3+cx^2+dx+e$. A fifth order polynomial algorithm of the wire can be: $y=ax^5+bx^4+cx^3+dx^2+ex+f$.

Within the third, fourth, and/or fifth order polynomial algorithm, x and y can both be coordinates along the wire, and a, b, c, d, e, and f can each be coefficients to be solved by a least squares technique.

For example, survey observations obtained can be the y coordinate at the head of the wire derived from the global positioning system sensors and tangential azimuths along the wire derived from compass headings of the wire.

The third, fourth, and/or fifth order polynomial algorithm can provide accurate modeling within about a decimeter in extreme cross currents.

In benign conditions, the third, fourth, and/or fifth order polynomial algorithm can provide even more accurate modeling.

The third, fourth, and/or fifth order polynomial algorithm of the wire can be constructed using the nominal values from the library of nominal values for third, fourth, and/or fifth order polynomial coefficients, the local x-y coordinates of the first in-water sensors, and at least one distance along the wire from the library of known distances along the wire.

The data storage can have computer instructions to instruct the processor to compute an azimuth tangential to the wire at each second in-water sensor using the third, fourth, and/or fifth order polynomial algorithm.

As an example of computing an azimuth tangential using the third order polynomial algorithm, the equation, $y=ax^3+bx^2+cx+d$, can be used as a third order polynomial definition of a curve.

The equation, $y=ax^3+bx^2+cx+d$, can be differentiated by x, with a solution of: $dy/dx=3ax^2+2bx+c$, as the slope of the tangent at x.

The slope of the tangent at x can be converted to an azimuth using the following equation: $3\pi/2-\arctan(dy/dx)$.

The data storage can have computer instructions to instruct the processor to compute a difference between the computed azimuths tangential to the wire with the reoriented azimuths tangential to the wire from all of the second in-water sensors, thereby forming a residual.

For example, the difference between the computed azimuths tangential and the reoriented azimuths tangential can be computed by subtracting one from the other.

The data storage can have computer instructions to instruct the processor to use the residual with a linear least squares technique to update the library of nominal values for third, fourth, and/or fifth order polynomial coefficients.

In the linear least squares technique, the overall solution can minimize the sum of the squares of the residuals computed in solving every single equation using the third, fourth, and/or fifth order polynomial.

A regression model is a linear one when the model comprises a linear combination of the parameters. The generalization of the n-dimensional Pythagorean theorem to infinite-dimensional real inner product spaces is known as Parseval's identity or Parseval's equation. Particular examples of such a representation of a function are the Fourier series and the generalized Fourier series.

The data storage can have computer instructions to instruct the processor to construct an updated third, fourth, and/or fifth order polynomial algorithm of the wire using updated nominal values from the updated library of nominal values for third, fourth, and/or fifth order polynomial coefficients, the local x-y coordinates of the first in-water sensors, and at least one distance along the wire from the library of known distances along the wire.

The data storage can have computer instructions to instruct the processor to compute an updated azimuth tangential to the wire at each second in-water sensor.

The data storage can have computer instructions to instruct the processor to compute an updated difference between the computed updated azimuths tangential to the wire with the reoriented azimuths tangential to the wire from all of the second in-water sensors until the residual is determined to be within one of the preset limits from the library of preset limits.

The data storage can have computer instructions to instruct the processor to calculate a pair of local x-y coordinates for at least one of the plurality of nodes on the wire. For example, each pair of local x-y coordinates can be calculated using the third, fourth, and/or fifth order polynomial algorithms.

The data storage can have computer instructions to instruct the processor to use the bearing and a third rotation algorithm to rotate the pair of local x-y coordinates coordinates for at least one of the plurality of nodes on the wire from the local x-y coordinate system to the projected coordinate system.

In one or more embodiments the third rotation algorithm can be used to rotate from the local coordinates to the projected coordinates by a rotation angle θ. For example, third rotation algorithm can include: $E=x*\cos(\theta)-y*\sin(\theta)$, and $N=x*\sin(\theta)+y*\cos(\theta)$. Within the third rotation algorithm x is the local x coordinate, y is the local y coordinate, E is the projected easting coordinate, N is the projected northing coordinate, and θ is the rotation angle which is the computed bearing.

One or more embodiments of the system can include a third in-water sensor on each of the plurality of nodes, each of the first in-water sensors, and each of the second in-water sensors. Each third in-water sensor can be in communication with the processor. The third in-water sensors can be depth sensors that can measure water depths for each of the plurality of nodes, each of the first in-water sensors, and each of the second in-water sensors, and can transmit the measured water depths to the processor.

In one or more embodiments, a network can be in communication with the processor. The network can be satellite network, a cellular network, the internet, or Ethernet cables connected between processor and the in-water sensors, the nodes, or both.

The data storage can include computer instructions to instruct the processor to construct a real-time display of the wire. The real-time display can be a graphical user interface.

In one or more embodiments, the wire can have at least one streamer. Each streamer can be connected to at least one of the plurality of nodes. Each streamer can be configured to collect seismic data, such as a size, depth, or location of a near surface geological formation. The system can allow for accurate positioning of the at least one streamer The computer implemented system can include computer instructions in the data storage to instruct the processor to identify a location of the at least one streamer in real-time using the real-time display.

The computer implemented system can include computer instructions in the data storage to instruct the processor to transmit an alarm when the location of the at least one streamer moves outside of one of the preset limits in the library of preset limits associated with one of the plurality of nodes.

The alarm can be a text message, an email, an audible alarm, or a flashing light, and can be transmitted to a client device, another computer on the network, or presented in the real-time display. The alarm can be provided both onboard the floating vessel and remote to the floating vessel. The client device can be a mobile phone, a computer, a laptop, a tablet computer, or a similar device.

For example, the library of preset limits can include preset limits associated with each of the plurality of nodes. When the location a streamer moves outside of a preset limit for the node that streamer is attached to, the alarm can be transmitted.

Each streamer can be or include a hydrophone. Each hydrophone can be connected to at least one of the plurality of nodes for collecting seismic data of a near surface geological formation.

The computer implemented system can include computer instructions in the data storage to instruct the processor to create a trend analysis over time using the third, fourth, and/or fifth order polynomial algorithm.

The computer implemented system can include computer instructions in the data storage to instruct the processor to create a trend analysis event-by-event using the third, fourth, and/or fifth order polynomial algorithm.

The computer implemented system can include computer instructions in the data storage to instruct the processor to create a log file.

The log file can contain the local x-y coordinates, the projected coordinates of the projected coordinate system, or combinations thereof.

Turning now to the Figures, FIG. 1 depicts an embodiment of a computer system for positioning a wire 16. The wire 16 can be connected to, and stretched between, two separated tow lines, including a first tow line 18a and a second tow line 18b.

The tow lines 18a and 18b can be secured to a floating vessel 22. Two diverters can be secured to the tow lines 18a and 18b, including a first diverter 20a and a second diverter 20b.

The tow lines 18a and 18b can each have a length ranging from about 50 feet to about 500 feet and a diameter ranging from about ¼ of an inch to about 2 inches.

The tow lines 18a and 18b can extend from the floating vessel 22 at an angle from a centerline of the floating vessel 22, which can range from about 90 degrees to about 180 degrees.

The wire 16 can have a plurality of nodes, such as a first node 14a, a second node 14b, a third node 14c, a fourth node 14d, a fifth node 14e, and a sixth node 14f. The wire 16 can have from about 2 nodes to about 100 nodes.

The wire 16 can have a length ranging from about 50 feet to about 500 feet and a diameter ranging from about ¼ of an inch to about 2 inches.

One or more streamers can be attached to one or more of the plurality of nodes 14a-14f. For example a first streamer 116a can be attached to the first node 14a and a second streamer 116b can be attached to the second node 14b.

The streamers 116a and 116b can have a length ranging from about 1 foot to about 500 feet. The streamers 116a and 116b can collect seismic data of a near surface geological formation 110, such as a fault.

One or more hydrophones can be attached to one or more of the plurality of nodes 14a-14f. For example, a first hydrophone 120a can be attached to the third node 14c and a second hydrophone 120b can be attached to the fourth node 14d.

The hydrophones 120a and 120b can be those made by Teledyne Instruments, such as a T-2BX hydrophone with an encapsulated hydrophone sensor element or the like.

The hydrophones 120a and 120b can collect seismic data of the near surface geological formation 110, such as a depth of the fault, size of the fault, or the like.

The computer system can include one or more first in-water sensors 24a, 24b, 24c, and 24d deployed on or proximate the wire 16.

For example, the first in-water sensor 24a can be deployed near the first tow line 18a, and can be embedded in the wire 16. The first in-water sensor 24b can be positioned proximate to the second tow line 18b. The first in-water sensor 24c can be towed near the wire 16. The first in-water sensor 24d can be supported by a buoy 26 towed from the wire 16 and can be positioned proximate to the wire 16.

The computer system can include one or more second in-water sensors 28a and 28b deployed on the wire 16. The second in-water sensors 28a and 28b can be deployed to provide azimuths tangential to the wire 16.

The second in-water sensor 28a can be embedded in the wire 16 at the first node 14a, and the second in-water sensor 28b can be attached to the wire 16 between the second node 14b and the third node 14c.

The computer system can include a processor 32 in communication with a data storage 34, which can be disposed on the floating vessel 22.

The processor 32 can be in communication with the first in-water sensors 24a-24d and the second in-water sensors 28a and 28b, such as through cables 57a and 57b, which can be Ethernet cables.

The system can also include third in-water sensors, such as third in-water sensors 29a, 29b, and 29c, which can be in communication with the processor 32 through the cables 57a and 57b.

The third in-water sensor 29a is shown on the fifth node 14e, the third in-water sensor 29b is shown on the second in-water sensor 28b, and the third in-water sensor 29c is shown on the first in-water sensor 24c. The system can include any number of first in-water sensors, second in-water sensors, and third in-water sensors disposed at various positions along the wire 16.

The third in-water sensors 29a, 29b and 29c can be depth sensors that transmit water depths for each of the plurality of nodes 14a-14f, each of the first in-water sensors 24a-24d, and each of the second in-water sensors 28a and 28b.

A client device 13 can be in communication with the processor 32, such as through a network 108, for remote monitoring. For example, the client device 13 can receive one or more alarms 128. The alarms 128 can be flashing lights, an audible signal, or the like.

In operation, the floating vessel 22 can move along a surface of the water pulling the tow lines 18a and 18b, the wire 16, the streamers 116a and 116b, and the hydrophones 120a and 120b.

The first in-water sensors 24a-24d, the second in-water sensors 28a and 28b, and the third in-water sensors 29a, 29b and 29c can be disposed above or below the surface of the water, and can collect sensor information for transmission to the processor 32 via the cables 57a and 57b.

The processor 32 can receive the sensor information, store the sensor information in the data storage 34, and utilize various computer instructions in the data storage 34 to perform calculations on the sensor information for positioning the plurality of nodes 14a-14f of the wire 16.

The processor 32 can utilize the computer instructions and data stored in the data storage 34 to perform various calculations, as described herein, to determine a position of the wire 16, a direction of the wire 16, and a velocity of the wire 16.

Figure 2A:
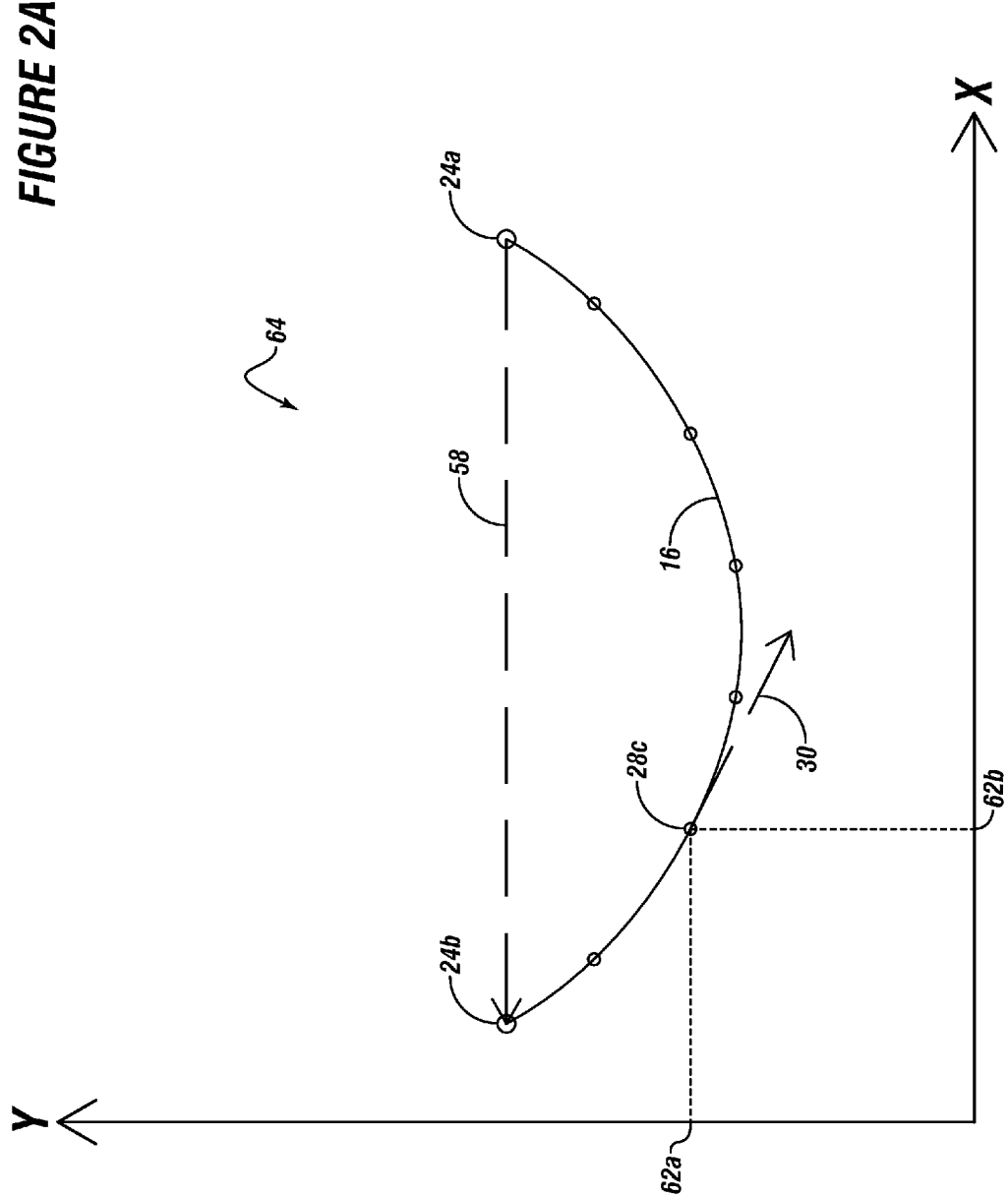

FIG. 2A depicts an embodiment of a local x-y coordinate system 64 with a position of the wire 16 plotted thereon.

The local x-y coordinate system 64 can be presented, such as on a display device or monitor in communication with the processor, as a portion of the real-time display.

The y-axis and x-axis both represent spatial measurements, such as in meters, of positions within the local x-y coordinate system 64.

On the plot of the wire 16, the position of the first in-water sensors 24a and 24b and the position of the second in-water sensor 28c are shown. For example, the local x-y coordinates 62a and 62b associated with the second in-water sensor 28c are shown plotted in the local x-y coordinate system 64.

A computed bearing 58 between the first in-water sensor 24a and the first in-water sensor 24b can be depicted on the local x-y coordinate system 64.

An azimuth 30 tangential to the wire 16 can also be depicted on the local x-y coordinate system 64.

FIG. 2B depicts an embodiment of a projected coordinate system 12 with a position of the wire 16 plotted thereon.

The projected coordinate system 12 can be presented, such as on the display device or monitor in communication with the processor, as a portion of the real-time display.

In the depicted projected coordinate system 12, the y-axis represents spatial measurements in a northing coordinate of the projected coordinate system 12, and the x-axis represents spatial measurements in an easting coordinate of the projected coordinate system 12.

The origin of the projected coordinate system 12 can be determined using the projected coordinates from at least one of the first in-water sensors 24a and 24b. For example, the first in-water sensor 24a can have projected coordinates 10a and 10b associated therewith and plotted within the projected coordinate system 12.

The computed bearing 58 between the first in-water sensor 24a and the first in-water sensor 24b can be depicted within the projected coordinate system 12.

The azimuth 30 tangential to the wire 16 from the second in-water sensor 28c can also be depicted within the projected coordinate system 12.

A representation of the local x-y coordinate system 64 can be depicted within the projected coordinate system 12 to show the relationship between the local x-y coordinate system 64 and the projected coordinate system 12.

Figure 3A:
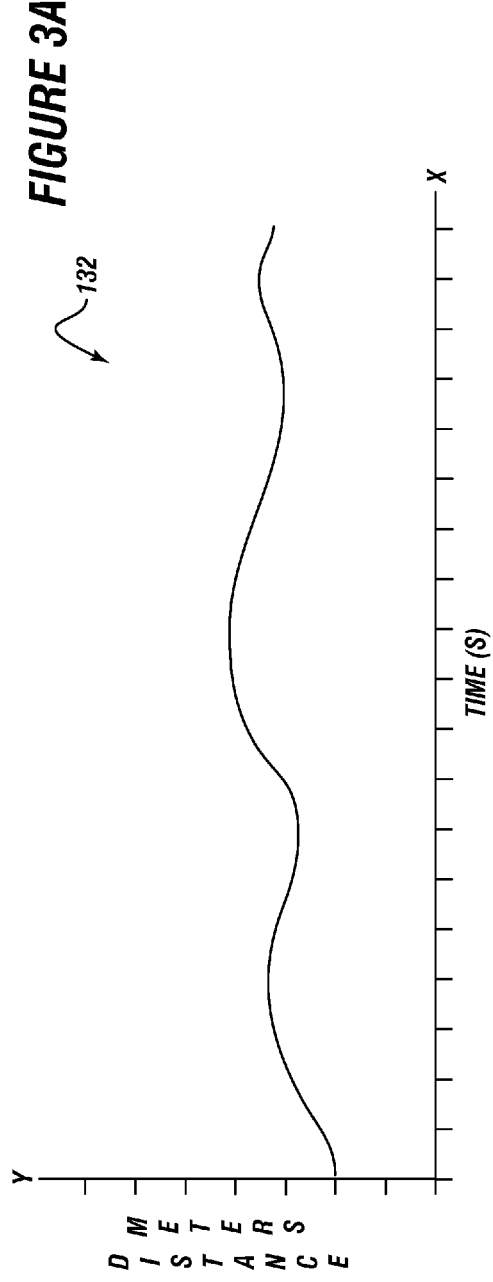
FIGS. 3A-3B depict embodiments of a trend analysis over time and a trend analysis event-by-event.
Figure 3B:
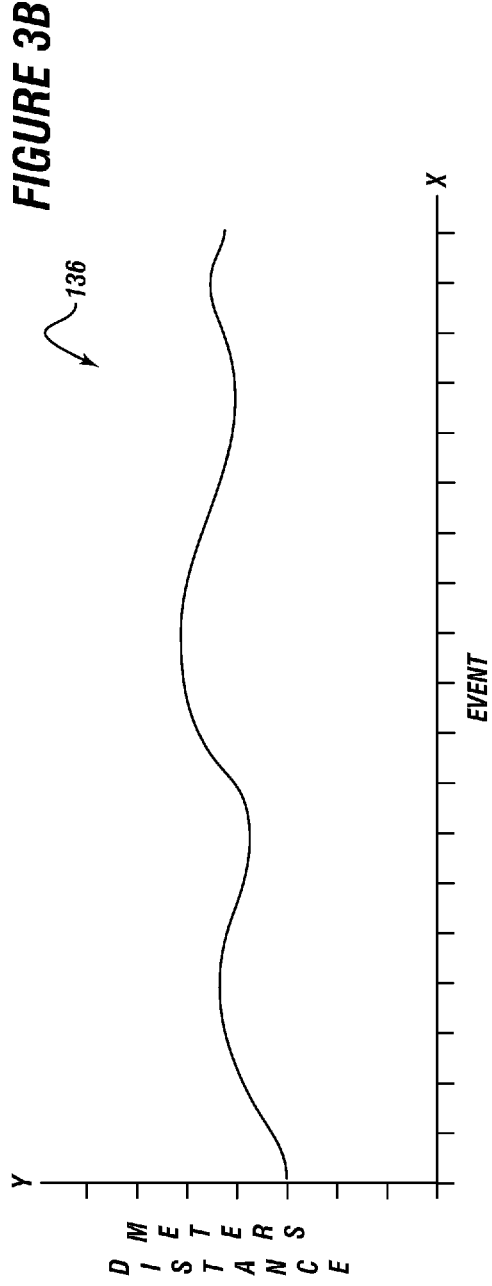
Figure 6B:
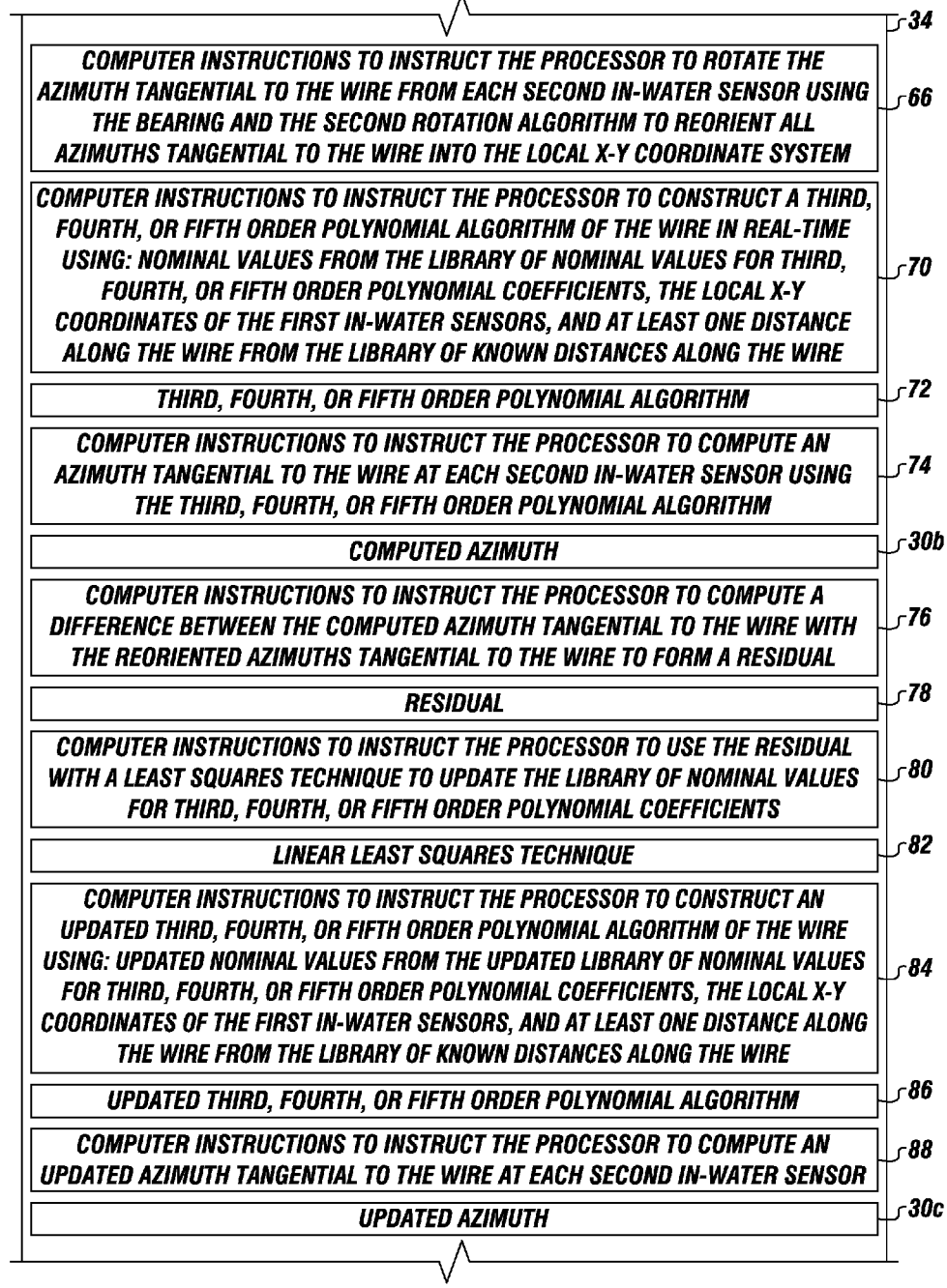
Figure 6D:
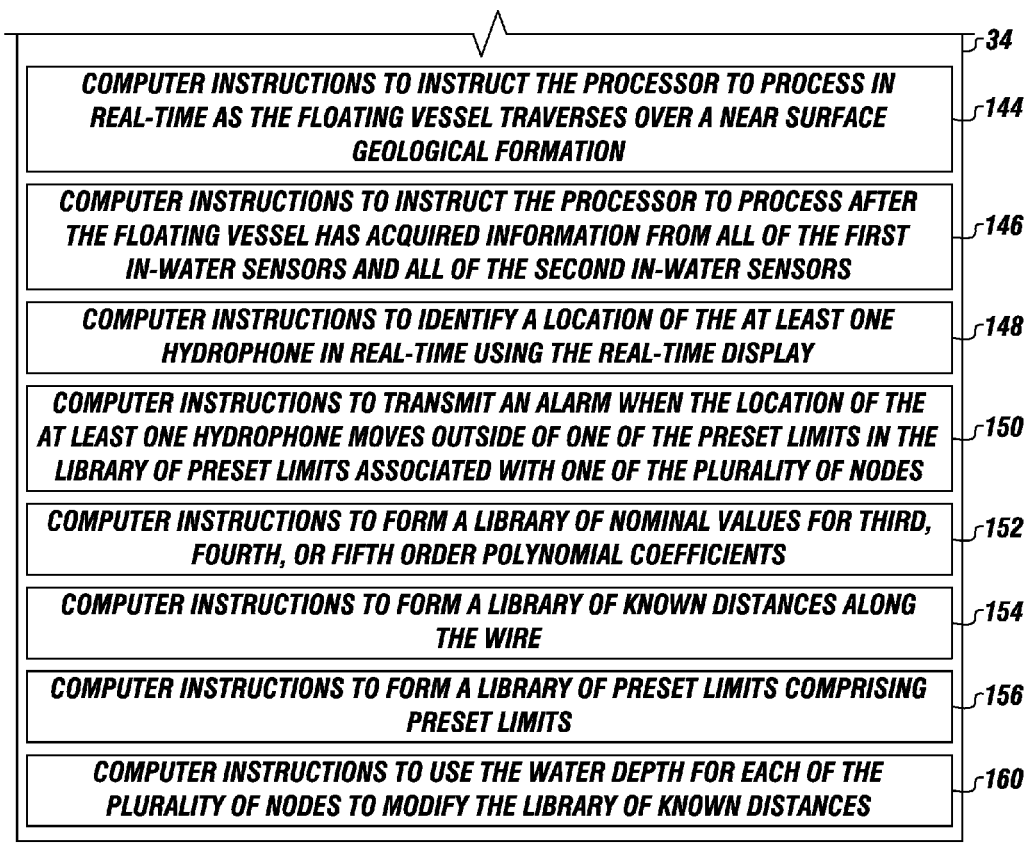

FIG. 3A depicts an embodiment of the trend analysis over time 132 and FIG. 3B depicts an embodiment of a trend analysis event-by-event 136.

For example, a distance between two nodes of the plurality of nodes on the wire can be plotted with respect to time, such as in seconds, to form the trend analysis over time 132.

A distance between two nodes of the plurality of nodes on the wire can be plotted with respect to events to form the trend analysis event-by-event 136. For example, an event can be the release of seismic energy. The events can be sequential.

FIG. 4 depicts an embodiment of the log file 140. The log file 140 can be created by tabulating various portions of data and sensor information within the data storage.

For example, the log file 140 can include a first column 143a showing various nodes of the plurality of nodes, such as the first node 14a in a first row of the log file 140, the second node 14b in a second row of the log file 140, and the third node 14c in a third row of the log file 140.

The log file 140 can include a second column 143b showing the local x-coordinate of the local x-y coordinates that are associated with the node in that particular row of the log file 140. For example, the local x-coordinate 62a can be 3 for the first node 14a, the local x-coordinate 62c can be 4 for the second node 14b, and the local x-coordinate 62e can be 5 for the third node 14c.

The log file 140 can include a third column 143c showing the local y-coordinate of the local x-y coordinates that are associated with the node in that particular row of the log file 140. For example, the local y-coordinate 62b can be 7 for the first node 14a, the local y-coordinate 62d can be 8 for the second node 14b, and the local y-coordinate 62f can be 9 for the third node 14c.

The log file 140 can include a fourth column 143d showing the projected x-coordinate of the projected coordinates that are associated with the node in that particular row of the log file 140. For example, the projected x-coordinate 10a can be 10000 for the first node 14a, the projected x-coordinate 10c can be 10001 for the second node 14b, and the projected x-coordinate 10e can be 10002 for the third node 14c.

The log file 140 can include a fifth column 143e showing the projected y-coordinate of the projected coordinates that are associated with the node in that particular row of the log file 140. For example, the projected local y-coordinate 10b can be 11001 for the first node 14a, the projected local y-coordinate 10d can be 11002 for the second node 14b, and the projected local y-coordinate 10f can be 11003 for the third node 14c.

The log file 140 can include a sixth column 143f showing events associated with the nodes in the first column 143a. For example, a first event 119a can be associated with the first node 14a, a second event 119b can be associated with the second node 14b, and a third event 119c can be associated with the third node 14c.

The log file 140 can include a seventh column 143g showing a time stamp associated with each event. For example, a time stamp 142a, which can be 1:01 pm for example, can be associated with the first event 119a. A time stamp 142b, which can be 1:02 pm for example, can be associated with the second event 119b. A time stamp 142c, which can be 1:03 pm for example, can be associated with third event 119c.

FIG. 5 depicts an embodiment of a portion of the real-time display 114.

The real-time display 114 can present a plot 115 of the wire 16. The real-time display 114 can present a depth profile 117 for the wire 16 and the streamers 116.

The depth profile 117 can be a plot of the water depths 31b of the wire 16 and the streamers 116 with respect to events 119.

The real-time display 114 can present a depiction of node separations 121 showing the distance between nodes along the wire 16.

The real-time display 114 can present compass data 123, such as compass headings of the second in-water sensors.

The real-time display 114 can present water depth data, such as water depths 31a of the first in-water sensors, the second in-water sensors, the streamers 116, the plurality of nodes, and/or the wire 16.

The real-time display 114 can present network solution data 125, such as polynomial coefficients. For example, the polynomial coefficient Ax, which is equal to 0.01, is shown along with other polynomial coefficients.

The real-time display 114 can present event information 127, such as an event number, here shown as 00002131, a date, and a time.

FIGS. 6A-6D depict an embodiment of the data storage 34.

The data storage 34 can include the library of nominal values for third, fourth, or fifth order polynomial coefficients 36 with nominal values 37 stored therein.

The data storage 34 can include the library of known distances along the wire 38 having at least one distance 39 along the wire, distances to each first in-water sensor 40, distances to each second in-water sensor 42, distances to each node of the plurality of nodes 44, and distances to desired locations along the wire 46.

The data storage 34 can include the library of preset limits 48 with preset limits 50.

The data storage 34 can include computer instructions for instructing the processor to receive sensor information from each first in-water sensor and each second in-water sensor 52.

The sensor information 54 can be stored in the data storage 34 with a time stamp 142, and can include an azimuth 30a tangential to the wire, and the projected coordinates 10 for a position on the wire.

The data storage 34 can include computer instructions to instruct the processor to use the projected coordinates from the first in-water sensors to compute a bearing between the first in-water sensors, and then to use the bearing with the sensor information and a first rotation algorithm to reorient the projected coordinates of all of the first in-water sensors to local x-y coordinates, forming a local x-y coordinate system 56.

The bearing 58 can be stored in the data storage 34.

Also the first rotation algorithm 60a, a second rotation algorithm 60b, and a third rotation algorithm 60c can be stored in the data storage 34.

The data storage 34 can include the local x-y coordinates 62 in the local x-y coordinate system 64 stored therein.

The data storage 34 can include computer instructions to instruct the processor to rotate the azimuth tangential to the wire from each second in-water sensor using the bearing and the second rotation algorithm to reorient all azimuths tangential to the wire into the local x-y coordinate system 66.

The data storage 34 can include computer instructions to instruct the processor to construct a third, fourth, or fifth order polynomial algorithm of the wire in real-time using nominal values from the library of nominal values for third, fourth, or fifth order polynomial coefficients, the local x-y coordinates of the first in-water sensors, and at least one distance along the wire from the library of known distances along the wire 70.

The third, fourth, or fifth order polynomial algorithm 72 can be stored in the data storage 34.

The data storage 34 can include computer instructions to instruct the processor to compute an azimuth tangential to the wire at each second in-water sensor using the third, fourth, or fifth order polynomial algorithm 74.

The computed azimuth 30b can be stored in the data storage 34.

The data storage 34 can include computer instructions to instruct the processor to compute a difference between the computed azimuth tangential to the wire with the reoriented azimuths tangential to the wire to form a residual 76.

The residual 78 can be stored in the data storage 34.

The data storage 34 can include computer instructions to instruct the processor to use the residual with a least squares technique to update the library of nominal values for third, fourth, or fifth order polynomial coefficients 80.

The linear least squares technique 82 can be stored in the data storage 34.

The data storage 34 can include computer instructions to instruct the processor to construct an updated third, fourth, or fifth order polynomial algorithm of the wire using updated nominal values from the updated library of nominal values for third, fourth, or fifth order polynomial coefficients, the local x-y coordinates of the first in-water sensors, and at least one distance along the wire from the library of known distances along the wire 84.

The updated third, fourth, or fifth order polynomial algorithm 86 can be stored in the data storage 34.

The data storage 34 can include computer instructions to instruct the processor to compute an updated azimuth tangential to the wire at each second in-water sensor 88.

The updated azimuth 30c can be stored in the data storage 34.

The data storage 34 can include computer instructions to instruct the processor to compute an updated difference between the computed updated azimuth tangential to the wire and the reoriented azimuth tangential to the wire until the residual is within one of the preset limits from the library of preset limits 90.

The data storage 34 can include computer instructions to instruct the processor to calculate a pair of local x-y coordinates for at least one of the plurality of nodes on the wire 92.

The calculated pair of local x-y coordinates 63a and 63b can be stored in the data storage 34.

The data storage 34 can include computer instructions to instruct the processor to use the bearing and the third rotation algorithm to rotate the pair of local x-y coordinates for at least one of the plurality of nodes on the wire from the local x-y coordinate system to the projected coordinate system 93.

The data storage 34 can have computer instructions to instruct the processor to construct a real-time display of the wire 112.

The data storage 34 can have computer instructions to instruct the processor to identify a location of the at least one streamer in real-time using the real-time display 122.

The location of the at least one streamer 124 can be stored in the data storage 34.

The data storage 34 can have computer instructions to instruct the processor to transmit an alarm when the location of the at least one streamer moves outside of one of the preset limits in the library of preset associated with one of the plurality of nodes 126.

The data storage 34 can have computer instructions to instruct the processor to create a trend analysis over time using the third, fourth, or fifth order polynomial algorithm 130.

The data storage 34 can have computer instructions to instruct the processor to create a trend analysis event-by-event using the third, fourth, or fifth order polynomial algorithm 134.

The data storage 34 can have computer instructions to instruct the processor to create a log file containing the local x-y coordinates, the projected coordinates of the projected coordinate system, or combinations thereof 138.

The data storage 34 can have computer instructions to instruct the processor to process in real-time as the floating vessel traverses over a near surface geological formation 144, and computer instructions to instruct the processor to process after the floating vessel has acquired information from all of the first in-water sensors and all of the second in-water sensors 146.

The data storage 34 can have computer instructions to identify a location of the at least one hydrophone in real-time using the real-time display 148, and computer instructions to transmit an alarm when the location of the at least one hydrophone moves outside of one of the preset limits in the library of preset limits associated with one of the plurality of nodes 150.

The data storage 34 can have computer instructions to form a library of nominal values for third, fourth, or fifth order polynomial coefficients 152, computer instructions to form a library of known distances along the wire 154, and computer instructions to form a library of preset limits comprising preset limits 156.

The data storage 34 can have computer instructions to use the water depth for each of the plurality of nodes to modify the library of known distances 160.

While these embodiments have been described with emphasis on the embodiments, it should be understood that within the scope of the appended claims, the embodiments might be practiced other than as specifically described herein.

What is claimed is:

1. A computer implemented system for determining projected coordinates in a projected coordinate system for at least one node on a wire having a plurality of nodes, wherein the wire is secured to two separated tow lines, wherein each tow line has a diverter, and wherein the two separated tow lines are secured to a floating vessel, the computer implemented system comprising:
   a. at least a pair of first in-water sensors deployed to determine the projected coordinates for a positioning on the wire, wherein each first in-water sensor is:
      (i) embedded in the wire;
      (ii) positioned adjacent to or on one of the plurality of nodes on the wire;
      (iii) proximate to the wire;
      (iv) on a buoy towed from the wire; or
      (v) combinations thereof;
   b. at least a pair of second in-water sensors deployed to provide azimuths tangential to the wire, wherein each second in-water sensor is:
      (i) embedded in the wire;
      (ii) attached to the wire; or
      (iii) combinations thereof;
   c. a processor with a data storage, wherein the processor is in communication with each first in-water sensor and each second in-water sensor;
   d. a library of nominal values for third, fourth, or fifth order polynomial coefficients stored in the data storage;
   e. a library of known distances along the wire stored in the data storage comprising:
      (i) distances to each first in-water sensor;
      (ii) distances to each second in-water sensor;
      (iii) distances to each node of the plurality of nodes;
      (iv) distances to locations along the wire; or
      (v) combinations thereof;
   f. a library of preset limits stored in the data storage comprising preset limits;
   g. computer instructions in the data storage for instructing the processor to receive sensor information from each first in-water sensor and each second in-water sensor, wherein the sensor information comprises:
      (i) an azimuth tangential to the wire;
      (ii) the projected coordinates for the position on the wire; or
      (iii) combinations thereof;
   h. computer instructions in the data storage to instruct the processor to:
      (i) use the projected coordinates from the first in-water sensors to compute a bearing between the first in-water sensors; and
      (ii) use the bearing with the sensor information and a first rotation algorithm to reorient the projected coordinates of all of the first in-water sensors to local x-y coordinates, forming a local x-y coordinate system;
   i. computer instructions in the data storage to instruct the processor to rotate the azimuth tangential to the wire from the second in-water sensors using the bearing and a second rotation algorithm to reorient all azimuths tangential to the wire of all of the second in-water sensors into the local x-y coordinate system;
j. computer instructions in the data storage to instruct the processor to construct a third, fourth, or fifth order polynomial algorithm of the wire using:
  (i) nominal values from the library of nominal values for third, fourth, or fifth order polynomial coefficients;
  (ii) the local x-y coordinates of the first in-water sensors; and
  (iii) at least one distance along the wire from the library of known distances along the wire;
k. computer instructions in the data storage to instruct the processor to compute an azimuth tangential to the wire at each second in-water sensor using the third, fourth, or fifth order polynomial algorithm;
l. computer instructions in the data storage to instruct the processor to compute a difference between the computed azimuth tangential to the wire with the reoriented azimuths tangential to the wire from all of the second in-water sensors, thereby forming a residual;
m. computer instructions in the data storage to instruct the processor to use the residual with a least squares technique to update the library of nominal values for third, fourth, or fifth order polynomial coefficients;
n. computer instructions in the data storage to instruct the processor to construct an updated third, fourth, or fifth order polynomial algorithm of the wire using:
  (i) updated nominal values from the updated library of nominal values for third, fourth, or fifth order polynomial coefficients;
  (ii) the local x-y coordinates of the first in-water sensors; and
  (iii) at least one distance along the wire from the library of known distances along the wire;
o. computer instructions in the data storage to instruct the processor to compute an updated azimuth tangential to the wire at each second in-water sensor;
p. computer instructions in the data storage to instruct the processor to compute an updated difference between the computed updated azimuth tangential to the wire with the reoriented azimuths tangential to the wire from all of the second in-water sensors until the residual is within one of the preset limits from the library of preset limits;
q. computer instructions in the data storage to instruct the processor to calculate a pair of local x-y coordinates for at least one of the plurality of nodes on the wire; and
r. computer instructions in the data storage to instruct the processor to use the bearing and a third rotation algorithm to rotate the pair of local x-y coordinates for at least one of the plurality of nodes on the wire from the local x-y coordinate system to the projected coordinate system.

2. The computer implemented system of claim 1, further comprising: a third in-water sensor on: each of the plurality of nodes, each of the first in-water sensors, and each of the second in-water sensors, wherein:
  a. each third in-water sensor is in communication with the processor; and
  b. each third in-water sensor is a depth sensor that transmits a water depth to the processor for: each of the plurality of nodes, each of the first in-water sensors, and each of the second in-water sensors.

3. The computer implemented system of claim 2, further comprising computer instructions in the data storage to use the water depths for each of the plurality of nodes to modify the library of known distances along the wire.

4. The computer implemented system of claim 1, wherein the two separated tow lines are wire rope, electrical wire, cable, polymer rope, hemp rope, or combinations thereof.

5. The computer implemented system of claim 1, wherein the pair of first in-water sensors that determine the position on the wire are:
  a. global positioning system sensors;
  b. laser sensors;
  c. acoustic sensors; or
  d. combinations thereof.

6. The computer implemented system of claim 1, further comprising a network in communication with the processor.

7. The computer implemented system of claim 1, wherein the processor processes in real-time as the floating vessel traverses over a near surface geological formation.

8. The computer implemented system of claim 1, wherein processing by the processor is completed after the floating vessel has acquired the sensor information from all of the first in-water sensors and all of the second in-water sensors.

9. The computer implemented system of claim 1, further comprising computer instructions in the data storage to instruct the processor to construct a real-time display of the wire.

10. The computer implemented system of claim 9, wherein the real-time display further comprises: a depth profile of the wire and streamers on the wire, separations between nodes of the plurality of nodes, compass data, depth data, the polynomial coefficients, event information, or combinations thereof.

11. The computer implemented system of claim 9, wherein the wire comprises at least one streamer, and wherein each streamer is connected to at least one of the plurality of nodes for collecting seismic data of a near surface geological formation.

12. The computer implemented system of claim 11, further comprising computer instructions in the data storage to instruct the processor to identify a location of the streamers in real-time using the real-time display.

13. The computer implemented system of claim 12, further comprising computer instructions in the data storage to instruct the processor to transmit an alarm to the real-time display or over a network when the location of any of the streamers moves outside of one of the preset limits in the library of preset limits.

14. The computer implemented system of claim 1, wherein the wire comprises at least one hydrophone, and wherein each hydrophone is connected to at least one of the plurality of nodes for collecting seismic data of a near surface geological formation.

15. The computer implemented system of claim 1, further comprising computer instructions in the data storage to instruct the processor to create a trend analysis over time using the third, fourth, or fifth order polynomial algorithm, wherein the trend analysis over time is a plot of distances between nodes of the plurality of node versus time.

16. The computer implemented system of claim 1, further comprising computer instructions in the data storage to instruct the processor to create a trend analysis event-by-event using the third, fourth, or fifth order polynomial algorithm, wherein the trend analysis event-by-event is a plot of distances between nodes of the plurality of node versus events.

17. The computer implemented system of claim 1, further comprising computer instructions in the data storage to instruct the processor to create a log file containing the local x-y coordinates, the projected coordinates of the projected coordinate system, events, time stamps, or combinations thereof.

18. The computer implemented system of claim 1, wherein the sensor information comprises a time stamp.

19. A computer implemented system for determining projected coordinates in a projected coordinate system for at least one node on a wire having a plurality of nodes, wherein the wire is secured to two separated tow lines, wherein each tow line has a diverter, and wherein the two separated tow lines are secured to a floating vessel, the computer implemented system comprising:
   (i) at least a pair of first in-water sensors deployed to determine the projected coordinates for a positioning on the wire;
   (ii) at least a pair of second in-water sensors deployed to provide azimuths tangential to the wire;
b. a processor with a data storage, wherein the processor is in communication with each first in-water sensor and each second in-water sensor;
c. a library of nominal values for third, fourth, or fifth order polynomial coefficients stored in the data storage;
d. a library of known distances along the wire stored in the data storage;
e. a library of preset limits stored in the data storage comprising preset limits;
f. computer instructions in the data storage for instructing the processor to receive sensor information from each first in-water sensor and each second in-water sensor, wherein the sensor information comprises:
   (i) an azimuth tangential to the wire;
   (ii) the projected coordinates for the position on the wire; or
   (iii) combinations thereof;
g. computer instructions in the data storage to instruct the processor to:
   (i) use the projected coordinates from the first in-water sensors to compute a bearing between the first in-water sensors; and
   (ii) use the bearing with the sensor information and a first rotation algorithm to reorient the projected coordinates of all of the first in-water sensors to local x-y coordinates, forming a local x-y coordinate system;
h. computer instructions in the data storage to instruct the processor to rotate the azimuth tangential to the wire from the second in-water sensors using the bearing and a second rotation algorithm to reorient all azimuths tangential to the wire of all of the second in-water sensors into the local x-y coordinate system; and
i. computer instructions in the data storage to instruct the processor to construct a third, fourth, or fifth order polynomial algorithm of the wire using:
   (i) nominal values from the library of nominal values for third, fourth, or fifth order polynomial coefficients;
   (ii) the local x-y coordinates of the first in-water sensors; and
   (iii) at least one distance along the wire from the library of known distances along the wire.

* * * * *

UNITED STATES PATENT AND TRADEMARK OFFICE
Certificate

Patent No. 8,069,006 B1

Patented: November 29, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Edward Majzlik, Houston, TX (US); Alfred L. Hise, Wiggins, MS (US); Brian Hardy, Friendswood, TX (US); and Noel Zinn, Missouri City, TX (US).

Signed and Sealed this Seventeenth Day of July 2012.

Jonathan C. Teixeira Moffat
Supervisory Patent Examiner
Art Unit 2857
Technology Center 2800